United States Patent [19]

Argillier et al.

[11] Patent Number: 5,618,780
[45] Date of Patent: Apr. 8, 1997

[54] LUBRICATING COMPOSITION INCLUDING AN ESTER-USE OF THE COMPOSITION AND WELL FLUID INCLUDING THE COMPOSITION

[75] Inventors: Jean-François Argillier, Suresnes; Annie Audibert, Le Vesinet; Pierre Marchand, Orgeval, all of France; André Demoulin, Beauvechain; Michel Janssen, Wezelbeej-Oppem, both of Belgium

[73] Assignee: Institut Francais Du Petrole, Rueil-Malmaison, France

[21] Appl. No.: 408,309

[22] Filed: Mar. 22, 1995

[30] Foreign Application Priority Data

Nov. 22, 1994 [FR] France ........................... 94 14254

[51] Int. Cl.$^6$ ............... C10M 129/28; C10M 129/70; C10M 129/74
[52] U.S. Cl. ................. 508/503; 507/218; 507/239; 507/244
[58] Field of Search ............... 252/56 R, 56 S, 252/49.3, 51.5 R; 507/218, 239, 244; 508/503

[56] References Cited

U.S. PATENT DOCUMENTS

| | | | |
|---|---|---|---|
| 3,277,001 | 10/1966 | Fischer et al. | 252/32.5 |
| 3,507,791 | 4/1970 | Teeter et al. | 252/32.5 |
| 4,113,635 | 9/1978 | Sakurai et al. | 252/51.5 R |
| 4,178,260 | 12/1979 | Cook et al. | 252/49.8 |
| 4,374,737 | 2/1983 | Larson et al. | 507/139 |
| 4,964,615 | 10/1990 | Mueller et al. | 507/139 |
| 5,120,708 | 6/1992 | Melear et al. | 507/126 |
| 5,318,956 | 6/1994 | Mueller et al. | 166/30 |

FOREIGN PATENT DOCUMENTS

| | | |
|---|---|---|
| 464491 | 1/1992 | European Pat. Off. . |
| 2077327 | 6/1981 | United Kingdom . |
| 94/07973 | 10/1993 | WIPO . |

OTHER PUBLICATIONS

*Manual of Drilling Fluids Technology*, NL Barold/NL Industries, Inc. 1985 no month available.
Derwent Publications 94–207669. Date Unknown.
Derwent Publications 89–338522. Date Unknown.

Primary Examiner—Margaret Medley
Attorney, Agent, or Firm—Millen, White, Zelano & Branigan, P.C.

[57] ABSTRACT

The present invention relates to an optimized lubricating composition including, in useful amount, an ester and a fatty acid, and optionally, the invention also relates to a well fluid including the lubricating composition according to the invention and the use of the composition for controlling the lubricity of a water-base fluid.

22 Claims, No Drawings

LUBRICATING COMPOSITION INCLUDING AN ESTER-USE OF THE COMPOSITION AND WELL FLUID INCLUDING THE COMPOSITION

FIELD OF THE INVENTION

The present invention relates to lubricating compositions for fluids used for well drilling or completion operations, or for workover operations in wells. More particularly, the invention describes a process and a composition for controlling the lubricity of water-base fluids set in wellbores.

BACKGROUND OF THE INVENTION

The conventional method for drilling wells, e.g., oil wells involves driving in rotation a toothed bit fastened to the end of a drillpipe string, the string being generally driven in rotation by a surface installation. A fluid, called drilling fluid or mud, is injected at the level of the bit through the inner space of the pipes. The main purposes of this fluid are to clean the bit and the well by taking the debris up to the surface, to stabilize the walls of the well, to inhibit reaction of the geologic formations in contact with the fluid, etc.

The present invention relates not only to the fluids called drilling fluids, but also to the fluids known as completion fluids, as well as to the fluids called workover fluids, all these fluids being referred to hereafter as well fluids. Completion is an operation which continues the drilling operation when the well reaches the producing formation. Completion notably consists in drilling through the reservoir rock, testing the formation, fitting out the well for production and bringing in. For these operations, the completion fluid may be notably specific to to the reservoir rock and to the effluents produced. Workover operations consist in working in a producing well in order to drill, redrill, clean the well or change equipment.

Well fluids must have characteristics which may be adjusted according to very varied uses, notably characteristic such as viscosity, their density or their filtrate control capacity. In some cases of strongly deflected wells, horizontal wellbores for example, or more generally wells providing considerable friction on the tubular elements lowered in the well, the lubricity of the fluid becomes an important characteristic.

Documents U.S. Pat. Nos. 4,964,615 and 5,318,956 describe the use of esters of vegetable origin in a mixture for drilling fluids. But none of these documents relates to the optimized composition according to the invention.

SUMMARY OF THE INVENTION

The present invention thus relates to a lubricating composition for a well fluid. It includes:

from 50% to 99% by weight of a part A consisting of one or several esters obtained by reaction of a monocarboxylic acid (A.1), linear or branched, including from 8 to 24 carbon atoms, and of a polyol (A.2), linear or branched, including from 2 to 20 carbon atoms, from 1% to 50% by weight of a part B consisting of one or several monocarboxylic acids, linear or branched, including from 8 to 24 carbon atoms.

The polyol A.2 may be, for example, neopentylglycol, pentaerythritol, dipentaerythritol, trimethylolpropane and ditrimethylolpropane.

The monocarboxylic acid (A.1 and part B) may have 1 to 3 unsaturations and includes 14 to 20 carbon atoms.

The polyol A.2 may have 2 to 5 hydroxyl groups and include from 2 to 6 carbon atoms. Preferably, the polyol may have 4 hydroxyl groups.

The monocarboxylic acid (A.1 and part B) may be selected from the group made up of oleic, stearic, linoleic, linolenic, palmitic, palmitoleic, myristic acid, and their mixture. The composition may include between 5 and 20% of part B, preferably about 10%.

The acid: alcohol mole ratio (A.1:A.2) may range between 1:1 and $(n-n/10):1$, preferably between $(1+n/10):1$ and $(n-n/5):1$, where n represents the number of hydroxyl groups of the alcohol A.2.

The composition may include between 80 and 95% of ester A, preferably about 90%.

The composition may also include at most 10% by weight of tertiary amine.

The tertiary amine may be a triethanolamine.

The amount of amine, expressed in molar equivalents with respect to acid B, may range between 0.2 and 1.2.

The ester part A, the acid part B and the triethanolamine may have respectively the following proportions by weight: about 85.4%, 9.5% and 5.1%.

The composition may include an emulsifying product in a proportion at most equal to 2% by weight with respect to the composition.

The emulsifying product may be selected from the group made up of RADIASURF 7137 (20 moles ethoxylated sorbitan monolaurate) and RADIASURF 7404 (polyethylene glycol monooleate of molecular mass 600).

The invention also relates to a use of the composition according to the invention for controlling the lubricity of a water-base well fluid.

In this use, the added amount of said composition may range between about 0.1% and 10% with respect to the fluid.

In case the well fluid is charged very little with reactive solids, the added amount of said composition may range between about 1% and 3% with respect to the fluid.

In case the fluid is charged with solids, the added amount of said composition may range between about 3% and 5% with respect to the fluid.

The invention also relates to a water-base well fluid including between 0.1% and 10%, preferably between 1% and 5% by weight of a lubricating composition as that defined in the present invention.

The applicant has found that the combination of the esters and of the acids in the proportions defined in accordance with the present invention leads to lubricating compositions which are particularly suitable when used in water-base well fluids.

According to another embodiment of the present invention, the applicant has found that certain physical properties of the water-base fluids could be even improved by mixing up to 10% by weight (with respect to the lubricating composition) of one or several tertiary amines into the lubricating composition.

According to another embodiment of the present invention, the applicant has found that the addition of up to 2% by weight (with respect to the lubricating composition) of an emulsifying product often allows the stability properties of the final composition to be improved.

It should be noted that the environmental protection regulations increasingly require that the various additives used in the formulation of well fluids have to be nontoxic and nonpolluting with respect to the environment.

The lubricating composition of the present invention notably affords the advantage of meeting the current criteria relating to environmental protection.

Furthermore, the present composition may be used with all the water-base well fluids, for example bentonite-bearing fluids, weighted up or not, high-pressure/high-temperature (HP/HT) fluids, solid free fluids, etc.

EXAMPLES

Other features and advantages of the invention will be clear from reading the following, non limitative examples.

The lubricity of a lubricating composition according to the invention is tested by means of a "Lubricity tester-Model 212" manufactured by the NL Baroid Petroleum Services company (Instruction Manual Part No.211210001EA). The tests ("Lubricity-surface to surface") are carried out according to the procedures recommended by the standard RP 13B of the American Petroleum Institute (API), (100 psi (689 kPa) at 60 rpm). In order to compare the lubricities of the various compositions, the graduations obtained with the test apparatus described above have been read. These readings correspond to relative values of the friction torque. The lower these read values are, the better the lubricity of the tested composition is.

The principle of the examples hereafter is to add to a base fluid a certain amount of a determined lubricating composition, the mixture being tested thereafter in the apparatus. Unless otherwise specified, the tests have been carried out at ambient temperature (about 25° C.).

The lubricating compositions tested hereafter are defined by the following nomenclature:

L1 corresponds to the ester pentaerythritol monooleate alone, marketed by the FINA company under the trade name of RADIASURF 7156.

L2 corresponds to the mixture by weight of pentaerythritol monooleate and of acid Radiacid 208 in the respective proportions of 85% and 15%. The Radiacid 208, marketed by the FINA company, contains about 70% of oleic acid, 10% of linoleic acid, 6% of palmitoleic acid, 5% of palmitic acid, 4% of myristic acid, 3% of linolenic acid and 2% of stearic acid.

L3 corresponds to a commercial lubricant: "MI-LUBE", marketed by the M.I. company (USA).

L4 corresponds to a commercial lubricant: "LUBRISAL", marketed by the MILLPARK company (USA).

L5 corresponds to gas oil.

L6 corresponds to a mixture of pentaerythritol monooleate and of triethanolamine in the respective proportions of 90% and 10%.

L7 corresponds to the mixture by weight of pentaerythritol monooleate, Radiacid 208 and triethanolamine in the respective proportions of 85.4%, 9.5% and 5.1%.

L8 corresponds to the mixture by weight of pentaerythritol monooleate and of Radiacid 208 in the respective proportions of 90% and 10%.

L9 corresponds to the ester 2-ethyl-hexyl oleate.

L10 corresponds to the mixture by weight of 2-ethyl-hexyl oleate and of Radiacid 208 in the respective proportions of 85% and 15%.

L11 corresponds to the mixture by weight of 2-ethyl-hexyl oleate and of Radiacid 208 in the respective proportions of 90% and 10%.

L12 corresponds to the mixture by weight of 2-ethyl-hexyl oleate and of Radiacid 208 in the respective proportions of 95% and 5%.

L13 corresponds to the system L7 to which 0.15% by weight of emulsifier RADIASURF 7137 (20 moles ethoxylated sorbitan monolaurate), marketed under this trade name by the FINA company, has been added.

L14 corresponds to the system L13 in which the emulsifier is replaced by RADIASURF 7404 (polyethylene glycol monooleate of molecular mass 600), marketed under this trade name by the FINA company.

L2, L7, L8, L13 and L14 correspond to preferred lubricating compositions according to the invention.

Example No. 1

Case of a conventional freshwater fluid
Composition of the base fluid:

| | |
|---|---|
| freshwater | |
| Wyoming bentonite | 30 g/l |
| viscosifier (Xanthan) | 2 g/l |
| filtrate reducer (AQUAPAC Reg) | 1 g/l |
| dispersant (Polyacrylate) | 3 g/l |
| NaOH such that | pH = 9 |

The dispersant is a polyacrylate FP 30S marketed by the COATEX company (France).

The product AQUAPAC Regular is marketed by the AQUALON company.

The xanthan used for all the tests is the IDVIS marketed by the Dowell Drilling Fluids company.

In this example, the lubricities of various systems are compared: gas oil (L5), two conventional commercial lubricants (L3, L4) and two systems L1 and L2 based on an ester as defined above.

The various systems have been added to the base fluid which is then mixed and tested.

| Base fluid | Torque reading 50 | | | | |
|---|---|---|---|---|---|
| Systems (%) | L1 | L2 | L3 | L4 | L5 |
| 0.5 | | 3 | 39 | 50 | 50 |
| 1 | 4 | 2 | 33 | 7 | 50 |
| 2 | 4 | 1 | 6 | 7 | 50 |
| 3 | 4 | 1 | 5 | 7 | 50 |
| 4 | 4 | 1 | 4 | 7 | 50 |
| 5 | 4 | 1 | 4 | 7 | 50 |

The results show the good performance of the system (L2) including two constituents according to the invention. It can be noted that the gas oil (L5) has comparatively a very poor lubricating property.

Example No. 2

Conventional potassium fluid
Composition of the base fluid:

| | |
|---|---|
| freshwater | |
| Wyoming bentonite | 30 g/l |
| viscosifier (Xanthan) | 2 g/l |
| filtrate reducer (AQUAPAC Reg) | 1 g/l |
| dispersant (Polyacrylate FP 30S) | 3 g/l |
| KCl | 50 g/l |
| NaOH such that | pH = 9 |

In this example, the lubricating performance of the systems identical to those of example 1 are compared.

| Base fluid | Torque reading 44 | | | | |
|---|---|---|---|---|---|
| Systems (%) | L1 | L2 | L3 | L4 | L5 |
| 1 | 44 | 44 | 44 | 44 | 44 |
| 3 | 37 | 10 | 6 | 50 | 44 |
| 4 | 19 | 8 | 6 | 50 | 44 |
| 5 | 7 | 3 | 6 | 50 | 44 |

One observes that, for a KCl fluid, the addition of gas oil or of lubricant L4 does not improve the lubricating properties. The system L1, based on ester alone, is efficient from 4% onwards. The performance of the system L2 and of the commercial lubricant L3 are the highest from a concentration of about 2.5%.

This example shows the part played by the acid Radiacid 208 in the ester-based composition.

Example No. 3

Conventional fluid in the presence of sodium chloride
Composition of the base fluid:

| freshwater | |
|---|---|
| Wyoming bentonite | 30 g/l |
| viscosifier (Xanthan) | 2 g/l |
| filtrate reducer (AQUAPAC Reg) | 1 g/l |
| dispersant (Polyacrylate FP 30S) | 3 g/l |
| NaCl | 50 g/l |
| NaOH such that | pH = 9 |

The lubricating performances of systems L1, L2 and L3 are compared in this example.

The measured values are given in the table hereunder:

| Base fluid | Torque reading 42 | | |
|---|---|---|---|
| Systems (%) | L1 | L2 | L3 |
| 0.5 | 42 | 5 | 42 |
| 1 | 42 | 2 | 42 |
| 2 | 42 | 2 | 42 |
| 3 | 38 | 2 | 14 |
| 4 | 14 | 1 | 4 |
| 5 | 5 | 1 | 4 |

These results show the very high performances of the system with two constituents L2 in the presence of sodium chloride.

Example No. 4

Conventional seawater fluid
Composition of the base fluid:

| seawater | |
|---|---|
| Wyoming bentonite | 30 g/l |
| viscosifier (Xanthan) | 2 g/l |
| filtrate reducer (AQUAPAC Reg) | 1 g/l |
| dispersant (Polyacrylate FP 30S) | 3 g/l |
| NaOH such that | pH = 9 |

The synthetic seawater used is made up of NaCl (28 g/l), $MgCl_2 \cdot 6H_2O$ (4.8 g/l), $CaCl_2$ (1.2 g/l), KCl (1.3 g/l), $MgSO_4 \cdot 7H_2O$ (7.2 g/l).

The lubricating performances of systems L1, L2, L3, IA and L5 are compared in this example.

The measured values are given in the table hereunder:

| Base fluid | Torque reading 44 | | | | |
|---|---|---|---|---|---|
| Systems (%) | L1 | L2 | L3 | L4 | L5 |
| 0.5 | 44 | 41 | 44 | 44 | 44 |
| 1 | 41 | 2 | 42 | 44 | 44 |
| 2 | 38 | 2 | 42 | 44 | 44 |
| 3 | 37 | 2 | 38 | 44 | 43 |
| 4 | 37 | 1 | 37 | 43 | 42 |
| 5 | 9 | 1 | 36 | 42 | 42 |

The commercial lubricants L3, L4 and the gas oil L5 are hardly efficient with this seawater formulation. It can be seen that the system L1 is efficient from 5% onwards, whereas the system with two constituents L2 is very efficient as soon as it is added to the formulation at a concentration of 1%.

Example No. 5

Conventional fluid in the presence of $CaCl_2$
Composition of the base fluid:

| freshwater | |
|---|---|
| Wyoming bentonite | 30 g/l |
| viscosifier (Xanthan) | 2 g/l |
| filtrate reducer (AQUAPAC Reg) | 1 g/l |
| dispersant (Polyacrylate FP 30S) | 3 g/l |
| $CaCl_2$ | 50 g/l |
| NaOH such that | pH = 9 |

In this example, the lubricating performances of the various systems: L3, L1, L2, L7 and L6 are compared.

| Base fluid | Torque reading 42 | | | | |
|---|---|---|---|---|---|
| Systems (%) | L1 | L2 | L3 | L6 | L7 |
| 0.5 | 40 | 40 | 42 | 41 | 32 |
| 1 | 38 | 38 | 42 | 39 | 6 |
| 2 | 36 | 36 | 42 | 38 | 2 |
| 3 | 36 | 20 | 42 | 36 | 2 |
| 4 | 6 | 2 | 42 | 34 | 2 |
| 5 | 5 | 2 | 42 | 14 | 2 |

These results show that, for this formulation containing $CaCl_2$, the ester L1 alone is not very efficient. The mixture L2 shows better performances, but the combination of the three products L7 produces the best results. By comparison, the commercial lubricant L3 is hardly efficient. Adding triethanolamine to the ester alone (L6) does not substantially improve the results. The most efficient combinations are ester+acid Radiacid 208 and ester+acid Radiacid 208+triethanolamine.

Example No. 6

Influence of the triethanol amine concentration in the mixture

The influence of the triethanolamine/acid Radiacid 208 molar concentration ratio in the lubricating mixture is tested. The formulation of the base fluid with which the systems are tested corresponds to the formulation of example 5.

The base lubricating system is made up of the mixture L8 of pentaerythritol monooleate/acid in the respective proportions of 90:10. A certain triethanolamine concentration expressed in molar equivalent with respect to the acid is added to this base system. The systems thus correspond to the following mixtures:

L8.0:pentaerythritol monooleate/acid 90:10
L8.1:L8.0+0.2 triethanolamine (TEA) molar equivalent
L8.2:L8.0+0.8 TEA equivalent
L8.3:L8.0+1.0 TEA equivalent
L8.5:L8.0+1.2 TEA equivalent
L8.6:L8.0+1.4 TEA equivalent.

It may be noted that the mixture L8.3 corresponds to the mixture L7.

|             | Torque reading |      |      |      |      |      |
| ----------- | -- | --- | -- | - | -- | -- |
| Systems (%) | L8.0 | L8.1 | L8.2 | L8.3 | L8.5 | L8.6 |
| 1 | 39 | 34 | 26 | 6 | 12 | 39 |
| 2 | 37 | 32 | 4 | 2 | 10 | 14 |

A synergistic effect of the TEA and of the acid is brought to light by these results.

These results show that the performance seems to be optimal when the acid and the triethanolamine molar ratios are close to one another. Furthermore, too high a TEA concentration with respect to the acid decreases the synergistic effect of the acid and of the ester.

The triethanolamine (or another tertiary amine) also affords the advantage of decreasing the corrosive effect of the acid (oleic acid for example) in the composition.

Example No. 7

Influence of the presence of solids in the formulation

The influence, on the lubricating properties, of the addition of barite in the formulation is studied in this example. The purpose of the barite is to increase the density of the mud. The presence of cuttings is also simulated by adding kaolinite and loading clay (FGN) to the formulation.

The lubricating system tested is L7.

The formulation of the base fluid is the formulation of example 4.

As the case may be, one adds barite to this base formulation until a density of 1.4 is obtained, 50 g/l of kaolinite or 50 g/l of loading clays.

|                | Torque reading |     |    |    |   |   |   |
| -------------- | -- | -- | -- | -- | - | - | - |
| System L7 (%)  | 0 | 0.5 | 1 | 2 | 3 | 4 | 5 |
| Base fluid     | 44 | 4 | 2 | 2 | 1 | 1 | 1 |
| + barite (d = 1.4) | 44 | 41 | 38 | 2 | 2 | 2 | 1 |
| + kaolinite    | 44 | 42 | 2 | 2 | 2 | 2 | 1 |
| + FGN          | 44 | 41 | 38 | 28 | 1 | 1 | 1 |
| + barite + kaolinite | 44 | 40 | 30 | 2 | 2 | 2 | 1 |
| + barite + FGN | 44 | 41 | 38 | 33 | 1 | 1 | 1 |

FGN is a loading clay marketed by the CKS company.

The presence of solids in the formulation requires a higher amount of lubricating system, but from 3% onwards, the results are excellent. In fact, it is well-known that the presence of solids in an aqueous formulation strongly decreases the performance of lubricating systems. It is well-known that very many commercial lubricating systems are barely or even not efficient in highly densified fluid formulations.

This test shows that the example L7 of the lubricating composition exhibits excellent lubricating properties in fluids charged with solids insofar as the proportion of said composition is adjusted with respect to the base fluid, particularly in view of the types and amounts of the solids present.

Example No. 8

High pressure/high temperature formulation
Composition of the base fluid:

| freshwater |  |  |
| --- | --- | --- |
| Wyoming bentonite |  | 19 g/l |
| mineral viscosifier (Thermavis) |  | 4.2 g/l |
| filtrate reducer (Thermacheck) |  | 6 g/l |
| dispersant (Thermathin) |  | 19 g/l |
| loading clay (FGN) |  | 50 g/l |
| barite such that | d = 1.4 | (525 g/l) |

The products Thermavis, Thermacheck and Thermathin are marketed by the BAROID company (USA). This formulation is proposed for "HP/HT" drilling.

The lubricating performances of the various systems: L5, L3, L4, L1, L2, L7, L8, L9, L11 and L12 are compared with this formulation.

The results are given hereunder:

|             | Torque reading |      |    |    |    |    |    |
| ----------- | -- | --- | -- | -- | -- | -- | -- |
| Systems (%) | 0 | 0.5 | 1 | 2 | 3 | 4 | 5 |
| L1 | 39 | 39 | 39 | 38 | 37 | 36 | 34 |
| L2 | 39 | 37 | 4 | 2 | 2 | 2 | 2 |
| L3 | 39 | 38 | 38 | 38 | 10 | 1 | 1 |
| L4 | 39 | 39 | 40 | 40 | 40 | 39 | 39 |
| L5 | 39 | 39 | 39 | 42 | 42 | 42 | 42 |
| L7 | 39 | 38 | 32 | 4 | 2 | 2 | 2 |
| L8 | 39 | 37 | 35 | 4 | 2 | 2 | 2 |
| L9 | 39 | 39 | 40 | 40 | 40 | 40 | 40 |
| L10 | 39 | 37 | 29 | 12 | 11 | 11 | 10 |
| L11 | 39 | 38 | 37 | 23 | 17 | 14 | 13 |
| L12 | 39 | 39 | 38 | 36 | 34 | 24 | 19 |

These tests show that neither the gas oil nor the commercial additive L4 have a lubricating efficiency. The additive L3 only works at a high concentration (from 4% onwards). The two esters alone (L1 and L9) are not efficient. However, a higher efficiency is observed when they are associated with the acid, the best results being obtained with the pentaerythritol monooleate. An acid Radiacid 208 concentration ranging between 10 and 15% produces excellent results. However, it may not be advisable to increase the acid concentration too much since it may increase corrosion risks.

Example No. 9

KCl/PHPA (polyacrylamide) formulation
Composition of the base fluid:

| freshwater |  |
| --- | --- |
| Wyoming bentonite | 30 g/l |
| PHPA (IDCAP) | 3 g/l |
| filtrate reducer (AQUAPAC Reg) | 1 g/l |
| KCl | 50 g/l |
| NaOH such that | pH = 9 |

The product AQUAPAC is marketed by the AQUALON company and the PHPA is a polyacrylamide of trademark IDCAP marketed by the Dowell Drilling Fluids company.

The lubricating performances of the gas oil (L5), of two conventional commercial lubricants (L3 and L4) and of system L7 are compared in this example.

| Systems (%) | Torque reading | | | | | | |
|---|---|---|---|---|---|---|---|
| | 0 | 0.5 | 1 | 2 | 3 | 4 | 5 |
| L3 | 38 | 38 | 38 | 25 | 4 | 4 | 4 |
| L4 | 38 | 38 | 38 | 33 | 31 | 31 | 30 |
| L5 | 38 | 38 | 38 | 38 | 36 | 35 | 33 |
| L7 | 38 | 36 | 31 | 10 | 2 | 2 | 2 |

These results show the very good lubricity of system L7.

Example No. 10

Influence of the addition of an emulsifier
Composition of the base fluid:

| | |
|---|---|
| freshwater | |
| Wyoming bentonite | 30 g/l |
| Xanthan (IDVIS) | 2 g/l |
| filtrate reducer (AQUAPAC Reg) | 1 g/l |
| dispersant (Polyacrylate FP 30S) | 3 g/l |
| $CaCl_2$ | 50 g/l |
| NaOH such that | pH = 9 |

The lubricating performances of the systems L7, L13 and L14 are compared in this example.

The two commercial emulsifiers are surfactants used to stabilize emulsions.

| Base fluid | Torque reading 42 | | |
|---|---|---|---|
| Systems (%) | L7 | L13 | L14 |
| 0.5 | 32 | 32 | 33 |
| 1 | 6 | 7 | 6 |
| 2 | 2 | 2 | 2 |
| 3 | 2 | 2 | 2 |
| 4 | 2 | 2 | 2 |
| 5 | 2 | 2 | 2 |

The following measurings have been performed after weighting the formulation with barite in order to have a density of 1.4.

| Base fluid | Torque reading 42 | | |
|---|---|---|---|
| Systems (%) | L7 | L13 | L14 |
| 0.5 | 38 | 38 | 37 |
| 1 | 32 | 33 | 32 |
| 2 | 29 | 29 | 28 |
| 3 | 2 | 2 | 2 |
| 4 | 2 | 2 | 2 |
| 5 | 2 | 2 | 2 |

In both cases, with a nonweighted or a weighted fluid, the addition of an emulsifier does not modify the lubricating capacity of the composition according to the invention.

Example No. 11

Influence of the addition of an emulsifier in a high pressure/high temperature formulation The composition of the base fluid is the same as that in example 8.

| Base fluid | Torque reading 39 | | |
|---|---|---|---|
| Systems (%) | L7 | L13 | L14 |
| 0.5 | 38 | 37 | 37 |
| 1 | 32 | 31 | 31 |
| 2 | 4 | 5 | 4 |
| 3 | 2 | 2 | 2 |
| 4 | 2 | 2 | 2 |
| 5 | 2 | 2 | 2 |

The addition of an emulsifier does not modify the lubricity.

Example No. 12

Influence of the addition of a lubricating system on the rheological and filtration properties The composition of the base fluid $FB_1$ is that of example 10.

One compares in this example the apparent viscosity VA and the plastic viscosity VP in mPa.s, the yield value YV in Pa (to be multiplied by 2.0886 to obtain YV in lb/100 ft$^2$), the API filtrate in milliliters (ml), of the base fluid FB, of system L13 and of system L14.

Systems L13 and L14 have been mixed with the base fluid in a proportion of 2% for the following measurements.

| Systems | $FB_1$ | L13 | L14 |
|---|---|---|---|
| VA | 17 | 17 | 16 |
| VP | 15 | 15 | 14 |
| YV | 1.9 | 1.9 | 1.9 |
| API filtrate | 19.6 | 13 | 13.6 |

The following measurings have been carried out after weighting the formulation with barite to obtain a density of 1.4. The systems L13 and L14 have been mixed with the base fluid in a proportion of 3%.

| Systems | $FB_1$ | L13 | L14 |
|---|---|---|---|
| VA | 30 | 26 | 27 |
| VP | 18 | 16 | 16 |
| YV | 11.5 | 9.6 | 10.5 |
| API filtrate | 37.4 | 17.2 | 18.2 |

One observes that the lubricating composition does not modify the rheology of the base fluid, weighted or not. On the other hand, the filtrate is markedly improved in both cases.

Example No. 13

Differential pressure sticking test

The tests consist in measuring the friction between the cake obtained by filtration of the fluid and a metallic piston simulating a drill string. The "Differential Sticking Tester-Model 21150" of Baroid Div of NL Corp (Instruction Manual Part No.211510001EA) is used for the tests.

The operating conditions are as follows: ambient temperature of the fluid, filtration differential pressure 3.5 MPa, pressure on the disk equivalent to 5 MPa, for 10 minutes.

Composition of the base fluid $FB_2$:

| | |
|---|---|
| freshwater | |
| Wyoming bentonite | 30 g/l |
| filtrate reducer (AQUAPAC Reg) | 1 g/l |
| NaCl | 1 g/l |
| Barite such that | d = 1.2 |

Reference $FB_2$ corresponds to the base formulation. The various lubricant systems which have been tested are: L5, L3, L4, L1 and L2.

| | Torque | |
|---|---|---|
| Formulations | (m.N) | (in.lbs) |
| $FB_2$ | 31.6 | 280 |
| $FB_2$ + 1% L5 | 21.5 | 190 |
| $FB_2$ + 2% L5 | 13.6 | 120 |
| $FB_2$ + 1% L3 | 9 | 80 |
| $FB_2$ + 2% L3 | 8 | 70 |
| $FB_2$ + 1% L4 | 11.3 | 100 |
| $FB_2$ + 2% L4 | 6.8 | 60 |
| $FB_2$ + 1% L1 | 5.6 | 50 |
| $FB_2$ + 2% L1 | no sticking | |
| $FB_2$ + 1% L2 | 4.5 | 40 |
| $FB_2$ + 2% L2 | no sticking | |

It is obvious that even the composition L1 (ester alone) is more efficient, for the same amount, than the conventional products. The optimized composition L2 exhibits excellent differential pressure antisticking characteristics.

Example No. 14

Fluid without reactive clay
Composition of the base fluid:

| | |
|---|---|
| freshwater | |
| Xanthan (IDVIS) | 4 g/l |
| filtrate reducer (AQUAPAC Reg) | 10 g/l |
| KCl | 50 g/l |
| Barite | 30 g/l |

| | Torque reading | | | | |
|---|---|---|---|---|---|
| Systems (%) | 0 | 0.5 | 1 | 2 | 3 |
| L13 | 32 | 2 | 1 | 1 | 1 |
| L3 | 32 | 6 | 5 | 5 | 5 |
| L4 | 32 | 12 | 9 | 8 | 8 |
| L7 | 32 | 2 | 1 | 1 | 1 |

These results show that, even in a fluid formulation without swelling (or reactive) clay, a formulation referred to as "solid free", the lubricating power of the composition according to the present invention, in L13 or L7 form, is excellent in relation to the commercial lubricants.

A test has been carried out with the same base fluid but without barite, with the composition L13:

| | Torque reading | | | | |
|---|---|---|---|---|---|
| Systems (%) | 0 | 0.5 | 1 | 2 | 3 |
| L13 | 32 | 3 | 2 | 2 | 2 |

Example No. 15

Influence of thermal aging
Composition of the base fluid:

| | |
|---|---|
| freshwater | |
| Wyoming bentonite | 30 g/l |
| NaCl | 1 g/l |

3% of the lubricating composition L7 or L13 is added to this very simple base formulation. Two fluid samples have been heated to 140° C. and 150° C. in a hot rolling test cell for 16 hours. After return to ambient temperature (about 25° C.), the lubricating power of the fluid samples has been tested in the lubricity tester according to the previous tests:

| | 25° C. | 140° C. | 150° C. |
|---|---|---|---|
| L7 | 1 | 1 | 1 |
| L13 | 1 | 1 | 1 |

This test confirms the excellent temperature strength of the lubricating system according to the invention.

We claim:

1. A lubricating composition for water-base well fluids, comprising:
   from 50% to 99% by weight of a part A consisting of one or several esters obtained by reaction of a monocarboxylic acid (A.1), linear or branched, having 8 to 24 carbon atoms, and of a polyol (A.2), linear or branched, having 2 to 20 carbon atoms, wherein the acid:alcohol molar ratio (A.1:A.2) is between 1:1 and n-n/10: 1, where n represents the number of hydroxyl groups of the alcohol A.2,
   from 1% to 50% by weight of a part B consisting of monocarboxylic acids, linear or branched, having 8 to 24 carbon atoms,
   and wherein the monocarboxylic acids in B are a mixture of at least 80% carboxylic acids having 1 to 3 unsaturations.

2. A composition of claim 1, wherein the monocarboxylic acid (A.1 and part B) has 14 to 20 carbon atoms.

3. A composition of claim 1, wherein said polyol A.2 has 2 to 5 hydroxyl groups and has 2 to 6 carbon atoms.

4. A composition of claim 1, wherein said monocarboxylic acid (A.1 and part B is oleic or linoleic acid or a mixture thereof.

5. A composition of claim 1, wherein the acid:alcohol molar ratio (A.1:A.2) is (1+n/10):1 to (n-n/5):1, where n represents the number of hydroxyl groups of the alcohol A.2.

6. A composition of claim 1, containing between 80% and 95% of ester A.

7. A composition of claim 1, further containing at most 10% of tertiary amine.

8. A composition of claim 7, wherein said tertiary amine is a triethanolamine.

9. A composition of claim 7, wherein the amount of said amine, expressed in molar equivalents with respect to the acid B, is 0.2 to 1.2.

10. A composition of claim 7, wherein the ester part A, the acid part B and the triethanolamine have respectively the following proportions by weight: about 85.4%, 9.5% and 5.1%.

11. A composition of claim 1, further containing an emulsifier in a proportion at most equal to 2% by weight with respect to said composition.

12. A composition of claim 11, wherein the emulsifier is ethoxylated sorbitan monolaurate or polyethylene glycol monooleate of molecular mass 600.

13. A method for enhancing the lubricity of a water-base well fluid, comprising admixing to said well fluid a composition of claim 1.

14. A method of claim 13, wherein the added amount of said composition is about 0.1% to 10% with respect to the fluid.

15. A method of claim 13, wherein the well fluid is essentially free of reactive solids, and the added amount of said composition is about 1% to 3% with respect to the fluid.

16. A method of claim 13, wherein the fluid is charged with solids, and the added amount of said composition is about 3% to 5% with respect to the fluid.

17. A water-base well fluid comprising 0.1% to 10% by weight of a lubricating composition of claim 1.

18. A water-base well fluid comprising 1% to 5% by weight of a lubricating composition of claim 1.

19. A method of enhancing the lubricity of an ester obtained by reaction of a monocarboxylic acid (A.1), linear or branched, having 8 to 24 carbon atoms, and of a polyol (A.2), linear or branched, having 2 to 20 carbon atoms, comprising adding to 50% to 99% by weight of said ester 1% to 50% by weight of (B) at least one linear or branched monocarboxylic acid having 8–24 carbon atoms, wherein the carboxylic acids (B) are a mixture of at least 80% carboxylic acids having 1–3 unsaturations.

20. A composition according to claim 6, containing about 90% of ester A.

21. A composition of claim 1, containing at least 3% by weight of (B).

22. A lubricating composition for water-base well fluids, consisting of:

from 50% to 99% by weight of a part A consisting of one or several esters obtained by reaction of a monocarboxylic acid (A.1), linear or branched, having 8 to 24 carbon atoms, and of a polyol (A.2), linear or branched, having 2 to 20 carbon atoms, wherein the acid:alcohol molar ratio (A.1:A.2) is between 1:1 and n-n/10:1, where n represents the number of hydroxyl groups of the alcohol A.2, from 1% to 50% by weight of a part B consisting of monocarboxylic acids, linear or branched, having 8 to 24 carbon atoms, and wherein the monocarboxylic acids in B are a mixture of at least 80% carboxylic acids having 1 to 3 unsaturations.

* * * * *